July 11, 1950     R. E. BROWN     2,514,623

PRESSURE LINE FILTER

Filed March 4, 1946

INVENTOR
RICHARD E. BROWN

BY
Hyde, Meyer, Baldwin & Doran
ATTORNEYS

Patented July 11, 1950

2,514,623

UNITED STATES PATENT OFFICE 2,514,623

PRESSURE LINE FILTER

Richard E. Brown, South Euclid, Ohio, assignor to Air-Maze Corporation, Cleveland, Ohio, a corporation of Delaware Application March 4, 1946, Serial No. 651,845

3 Claims. (Cl. 183—73)

This invention relates to improvements in a filter adapted for connection in a line under pressure so as to filter particles out of a gaseous stream passing through the line.

An object of the present invention is to provide a filter having a small number of parts but constructed to operate very efficiently.

Another object of the invention is to provide a novel arrangement for collecting solid particles upstream of the filter element, while collecting liquid particles downstream of the filter element, with means for returning the collected liquid upstream.

Another object of the present invention is to provide a vortex chamber to aid in the separation of solid particles together with a filter element eccentric of said vortex chamber whereby a greater efficiency is obtained in the collection of solid particles before the gaseous stream enters the filter element.

Other objects and advantages of the present invention will be apparent from the accompanying drawings and description, and the essential features thereof will be summarized in the appended claims.

In the drawings,

Fig. 3 is a sectional view taken along the line 3—3 of Fig. 1; while

Figure 2:
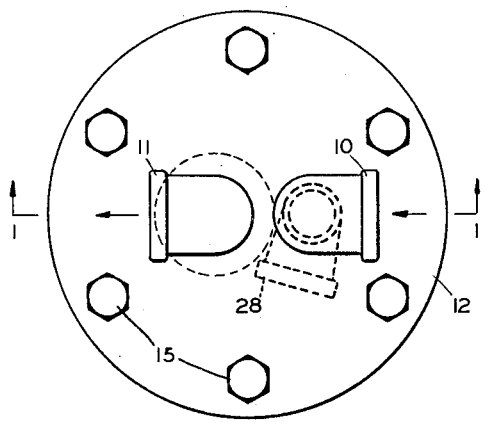
Fig. 2 is a top plan view of the device of Fig. 1.

The present device is adapted to be connected in series with a pipeline carrying a gaseous stream. The inlet pipe is connected to the elbow portion 10, while the discharge pipe is connected to the elbow portion 11. These elbow portions are integral parts of a top casting 12 which is cheaply constructed and furnishes the support for the rest of the device. The lower part of the device is of generally cylindrical form as indicated at 13 having a closed bottom portion 13a. The upper periphery of the cylindrical part 13 is connected in any suitable manner to a top ring 14. The connection shown comprises the peening of the upper periphery of the cylindrical walls as indicated at 13b into an annular notch or trough 14a around the outer wall of the ring 14. The periphery 13b may be brazed, soldered, or welded to the ring 14 for security, if necessary or desirable. Bolts 15 pass through the top casting 12 and into the ring 14 to connect the parts together. A gasket 16 is used between these parts to insure a gas tight joint.

A cylindrical filter element 17 is positioned between substantially uninterrupted top and bottom caps 18 and 19, respectively. The top cap 18 is annular. The bottom cap is circular. These caps have peripheral flanges 18a and 19a embracing the outside of the filter element. A bolt 20 extends through suitable openings in the caps 18 and 19 and is threaded into the elbow portion 11 at 21 to hold the filter element in place. This filter element is positioned eccentrically relative to the cylindrical portion 13 as will be apparent in the various views, the eccentricity being marked A in Fig. 3. The eccentricity of the filter element is on that side of the cylindrical housing 13 opposite the inlet elbow portion 10.

Figure 4:
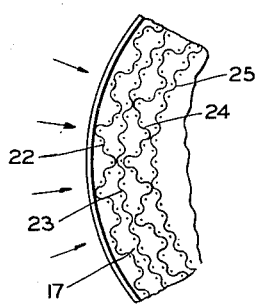
Fig. 4 is an enlarged fragmental sectional view taken along the line 4—4 of Fig. 1.

The details of one form of filter element which is especially suitable for my purpose, are shown in Fig. 4. The outermost layer 22 comprises woven wire screen of approximately 30 mesh and formed in zig-zag folds which extend vertically. The next layer 23 is also of 30 mesh wire screen, but without corrugations. The next layer inwardly 24 is of 18 mesh wire screen with corrugations extending vertically. The innermost layer 25 is of plain or uncorrugated 18 mesh wire screen. These various layers touch each other and I can see that in the operation of my device where the gaseous stream is in the direction of the arrows of Fig. 4, radially inwardly, the very fine droplets of liquid collect on screens 22 and 23 and coagulate into larger drops, which in turn, are caught on the screens 24 and 25 where they are of sufficient drop size to run down the streams under the influence of gravity, collecting in the bottom cap 19.

Figure 1:
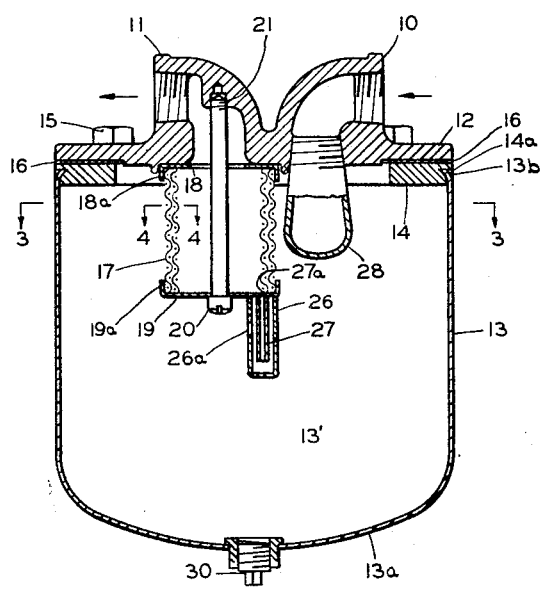
Fig. 1 is a central sectional view taken along the line 1—1 of Fig. 2.

Manometer liquid seal means is provided for returning liquid collected in the bottom cap 19 upstream of the filter element 17 to the chamber 13' downstream of the filter element. This means, as closely shown in Fig. 1, comprises a seal, the outer leg of which is a tubular member 26 closed at all points except for the overflow opening 26a. The inner leg comprises tube 27 of lesser diameter in the interior diameter of the tube 26, open at the bottom and top and communicating through a suitable opening 27a with the inner surface of cap 19 where the liquid collects. This device acts very efficiently to return liquid from the interior of the filter element 17 to the chamber 13' provided the distance from the bottom of tube 27 to the overflow opening 26a is sufficient to prevent the blowing of the seal when the device is subjected to a differential pressure in actual use.

Figure 3:
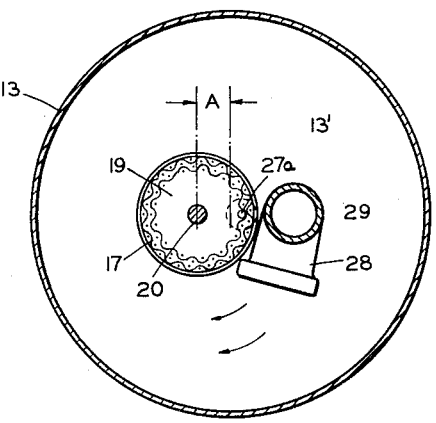

Means is provided to give a swirling or vortical movement to the fluid stream as it enters the chamber 13'. The means here shown, comprises a pipe elbow 28 screwed into the inlet elbow portion 10 and turned as indicated in Figs. 2 and 3 so that the incoming stream takes the direction indicated by the arrows of Fig. 3. This causes the fluid stream to circle inside of the cylindrical wall 13 before it moves toward the filter element 17 for discharge. This swirling movement causes many of the solid particles and liquid droplets to be thrown out of centrifugal action, after which they settle to the bottom of chamber 13'. I find that by placing the filter element 17 eccentric with relation to the cylindrical wall 13 that a comparatively dead space is provided in the zone 29 indicated in Fig. 3, on the side of the chamber 13' opposite the eccentricity A. Here, the annular path of the swirling fluid stream is of greater cross-section with a consequent slowing down of particles carried by the fluid stream. In test devices there is a much heavier deposit of particles in the zone 29 than anywhere else.

Preferably, some means is provided for draining the chamber 13', and I have indicated a simple drain plug 30 for that purpose.

Access to all of the parts is very easy by simply removing the bolts 15. Then, upon lifting the cover 12, the elbow 28, the filter element and the seal 26, 27, all comes away attached to the top.

I have thus described a device having a relatively small number of parts simply arranged and very efficient in the removing of all solid and liquid particles from a gaseous stream passing through the device.

What I claim is:

1. In a pressure line filter, a hollow body having a vertical cylindrical wall and closed at top and bottom, inlet and outlet elbow portions communicating with the hollow of said body through the top thereof, an annular filter element having an axis eccentric to the axis of said cylindrical wall, the hollow interior of said filter element communicating at the top with said outlet elbow only, a cap closing the bottom of said hollow interior of said filter element, said cap spaced above the bottom wall of said hollow body manometer liquid seal means connected with said cap and having one leg in communication with the hollow interior of said filter element and the other leg in communication with the hollow of said body, and said inlet elbow being positioned with its outlet end extending at an angle to the radius of said cylindrical wall so as to provide vortical movement of fluid entering said body at said inlet elbow, the interior of said hollow body being free of obstructions except for the parts named, whereby vortex action of an entering fluid stream throws out particles at the inner face of said cylindrical wall and more particles at the zone in said body opposite the eccentricity of said filter element axis, additional filtering takes place as the stream passes to the hollow interior of said filter element, and liquid removed by said filter element returns through said seal means to the hollow of said body.

2. In a pressure line filter, a hollow body having a vertical cylindrical wall and closed at the bottom, a separable top for closing the top of said cylindrical wall, detachable means for securing said top to said body, inlet and outlet elbow portions communicating with the hollow of said body through the top thereof, an annular filter element having an axis eccentric to the axis of said cylindrical wall, said eccentricity being on the side opposite said inlet elbow portion, the hollow interior of said filter element communicating at the top with said outlet elbow only, a cap closing the bottom of said hollow interior of said filter element, said cap spaced above the bottom wall of said hollow body bolt means passing through said cap and threaded into said top and holding said filter element tight against said top, manometer liquid seal means connected with said cap and having one leg in communication with the hollow interior of said filter element and the other leg in communication with the hollow of said body, and said inlet elbow being positioned with its outlet end extending at an angle to the radius of said cylindrical wall so as to provide vortical movement of fluid entering said body at said inlet elbow, the interior of said hollow body being free of obstructions except for the parts named, whereby vortex action of an entering fluid stream throws out particles at the inner face of said cylindrical wall and more particles at the zone in said body opposite the eccentricity of said filter element axis, additional filtering takes place as the stream passes to the hollow interior of said filter element, and liquid removed by said filter element returns through said seal means to the hollow of said body.

3. In a pressure line filter, a hollow body having a vertical cylindrical wall and closed at top and bottom, inlet and outlet conduit portions communicating with the hollow of said body near the top thereof, an annular filter element having an axis eccentric to the axis of said cylindrical wall, said eccentricity being on the side opposite said inlet conduit portion, said filter element comprising closely spaced filaments for separating liquid particles from a gaseous stream, the hollow interior of said filter element communicating at the top with said outlet conduit portion only, a cap closing the bottom of said hollow interior of said filter element, said cap spaced above the bottom wall of said hollow body, manometer liquid seal means connected with said cap and having one leg in communication with the hollow interior of said filter element and the other leg in communication with the hollow of said body, and said inlet conduit portion being positioned to deliver a stream at an angle to the radius of said cylindrical wall so as to provide vortical movement of fluid entering said body at said inlet conduit, the interior of said hollow body being free of obstructions except for the parts named, whereby vortex action of an entering fluid stream throws out particles at the inner face of said cylindrical wall and more particles at the zone in said body opposite the eccentricity of said filter element axis, additional filtering takes place as the stream passes to the hollow interior of said filter element, and liquid removed by said filter element returns through said seal means to the hollow of said body.

RICHARD E. BROWN.

REFERENCES CITED

The following references are of record in the file of this patent:

UNITED STATES PATENTS

| Number | Name | Date |
|---|---|---|
| 956,231 | Thurman | Apr. 26, 1910 |
| 1,107,485 | Bowser | Aug. 18, 1914 |
| 1,535,819 | Emmet | Apr. 28, 1925 |
| 1,553,973 | Ballou | Sept. 15, 1925 |
| 1,805,824 | Hendrickson | May 19, 1931 |
| 1,912,235 | Winslow | May 30, 1933 |
| 2,068,048 | Adams | Jan. 19, 1937 |
| 2,204,017 | Kehle | June 11, 1940 |